Patented Sept. 7, 1937

2,092,450

UNITED STATES PATENT OFFICE 2,092,450

MANUFACTURE OF CONDENSATION PRODUCTS FROM ALIPHATIC ORGANIC COMPOUNDS

Otto Fuchs, Frankfort-on-the-Main, and Wilhelm Querfurth, Mainz-Mombach, Germany No Drawing. Application March 27, 1934, Serial No. 717,680. In Great Britain October 26, 1931

12 Claims. (Cl. 260—138)

This application is a continuation in part of application Serial No. 639,734 filed October 26, 1932.

The present invention relates to the manufacture of valuable condensation products from the oxygenated derivatives of the paraffin series of hydrocarbons and specifically relates to the production of alcohols, esters and other valuable derivatives of higher molecular weight from alcohols which contain more than four carbon atoms in the molecule and mixtures of such alcohols with other alcohols by catalytic treatment in the presence of hydrogen.

In carrying out the manufacture according to the present invention we use catalysts which consist of a difficultly reducible oxide or mixture of oxides having only feeble or no basic action and being stable at the prevailing temperature, together with a metal or mixture of metals known to have a hydrogenating or dehydrogenating action and not exceeding in quantity ten per cent by weight of the complete catalyst. The metal or metals may be taken in their metallic state and be admixed as such or the oxide or oxides may be used, it being understood that owing to the use of hydrogen as hereinbefore mentioned and as hereinafter described the oxide or oxides will rapidly be reduced. We may also use, as an addition in the catalyst, oxides having a basic reaction, but we prefer to limit the amount of these basic oxides so that the proportion present is always less than the proportion of the other catalytic constituents. We have found, however, that it may be preferable to employ a catalyst containing larger amounts of the basic oxide. The catalyst may be used on carriers, such as pumice or other inert material.

According to the present invention it is essential that hydrogen or nitrogen should be added to the reaction mixture as it has been found that improved technical results are obtained by this addition; and, moreover, the addition of hydrogen increases the activity and the life of the catalyst. Suitable amounts of hydrogen are from one half mol. hydrogen to three or more mols hydrogen for each mol. of aliphatic compound.

The conversion can be carried out at temperatures between 150 and 450° C. and atmospheric or increased pressure may be used. Generally we prefer to use moderately increased pressures up to fifty atmospheres.

As examples of the metallic oxides of feeble basic action which can be used may be mentioned alumina, uranium oxide, thoria, beryllium oxide and zirconium oxide and so forth, and as catalytic metals can be mentioned copper, nickel, silver, chromium, cadmium, zinc, tin, manganese and cobalt. Suitable oxides having a basic reaction are calcium oxide, barium oxide, strontium oxide, magnesia and lithia. By the passage of a mixture of acetaldehyde and hydrogen, for instance, over a catalyst consisting of alumina and copper, there may be obtained considerable quantities of higher esters and higher alcohols, and substantially the whole of the acetaldehyde unconverted into the aforesaid higher products is recovered without decomposition.

We have also found that by altering the proportions of metal oxide and catalytic metal in the catalyst, the course of the reaction can be influenced so that either higher yields of alcohols and the like can be produced, or the conversion can be directed towards the production of larger proportions of esters and so forth. It is essential, however, that the proportion of catalytic metal should not exceed ten per cent by weight of the total catalyst.

After the catalytic conversion the products of the reaction may be condensed and separated, or partially condensed and recirculated over the catalyst. The unconverted starting material may be recirculated over the catalyst alone or together with any of the products of the reaction.

The present invention contemplates the preparation of valuable products by passing a mixture of alcohols which contain more than four carbon atoms in the molecule together with other alcohols over catalysts of the above mentioned type in the presence of hydrogen at temperatures between 150 and 450° C. and in some cases at elevated pressure. Alcohols having more than four carbon atoms in the molecule may be treated separately but preferably will be treated in mixtures of which the following are examples. Amyl alcohols, together with methyl, ethyl, butyl, hexyl, heptyl, octyl alcohols, etc. Hexyl alcohols in mixtures with methyl, ethyl, butyl, heptyl, octyl alcohols, etc. The mixtures can be composed of one or more of the alcohols indicated.

It is evident that this process does not merely involve a reaction between each molecule of amyl or hexyl alcohol with each molecule of the alcohols with which they are mixed. Instead, all possible reactions are involved and these proceed in accordance with the law of mass action. Condensations between like molecules will be more or less in the foreground, depending upon the concentration of the molecules involved. Or, in other words, in accordance with the law of mass action.

The following general examples are illustrative of the invention, but they are in no case to be regarded in a limitative light but merely for purposes of illustration.

Example I

The catalyst used is composed as follows:

| | Grams |
|---|---|
| Magnesia | 438 |
| Copper oxide | 19 |
| Alumina hydroxide gel (15 per cent) | 264 |
| Iron nitrate | 11 |
| Saw dust (700 mesh per sq. cm.) | 27 |
| Phosphorous acid | 222 | with the addition of a sufficient quantity of water (ca. 900 ccm.) were well mixed together. The mass obtained was dried and broken into pieces. This catalyst was then filled into a pressure resistant tube furnished with electrical heating.

A mixture of 2.01 mols ethyl alcohol, 1.99 mols isoamyl alcohol (obtained by a fermentation process) in a vaporous state and 3.38 mols hydrogen per hour were passed over the said catalyst at 334° C. and a pressure of 29 atmospheres. The reaction product consisted of:

| | Mol. per cent. |
|---|---|
| Acetaldehyde (relating to the total amount of carbon in the starting mixture) | 1.6 |
| Ethyl alcohol } Valeric aldehyde } | 23 |
| Butyl alcohol | 1.1 |
| Amyl alcohol | 50.9 |
| Heptyl alcohol and higher homologues thereof | 18.0 |

Example II

The mixture indicated in Example I is revised so as to be rich in ethyl alcohol. The resultant products will then contain increased amounts of butyl alcohol.

Example III

The mixture in Example I is revised so as to contain an excess of amyl alcohol. The resultant product will favor the formation of decyl alcohol.

The results set forth in the above three examples are similar when amyl alcohol and butyl alcohol are passed over a catalyst. If the quantity of butyl alcohol is in excess the reaction product will be rich in octyl alcohol.

The reaction set forth above may be carried out in the vapor phase or in the liquid phase in the presence of diluents. The reactions can also be carried out at atmospheric or at elevated pressure.

Example IV

The catalyst employed was composed as follows:—

| | |
|---|---|
| Magnesium oxide (parts Mg by weight) | 89 |
| Alumina (parts Al by weight) | 8 |
| Copper oxide (parts Cu by weight) | 3 |

As will be observed the amount of basic oxide is considerable. This is because we are here treating a mixture of alcohols including a higher alcohol as hereinbefore mentioned. Actually the mixture consisted of methyl alcohol, butyl alcohol, and hydrogen in the proportion of 4.6 mols methyl alcohol, 2 mols butyl alcohol and 2 mols hydrogen. This mixture was passed over the catalyst at a pressure of about 30 atmospheres and a temperature of 350° C.

The condensation products obtained (in addition to unchanged components and small amounts of acetaldehyde, butyraldehyde and esters of formic acid) were as follows:—

| | Parts by weight |
|---|---|
| Amyl alcohol | 1078 |
| Hexyl alcohol | 82 |
| Alcohols of higher boiling point especially heptyl alcohol | 480 |

This example shows that by using a mixture of alcohols including a higher alcohol together with methyl alcohol, the higher alcohols with a boiling point of over 120° C. can be obtained in considerable quantities. It is, for example, possible to take the mixed products resulting from any initial conversion of a lower alcohol into a higher alcohol and retreat it according to the present invention for the further conversion into higher alcohols. Similarly it is possible to take the mixed product of any initial conversion of a lower alcohol into a higher alcohol or to take either component of such a product and to mix it with a fresh quantity of an alcohol and subject that mixture to treatment according to the present invention.

We claim:—

1. The process of producing valuable condensation products from alcohols having more than four carbon atoms comprising subjecting such alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide as the preponderant constituent and the reaction temperature ranging from about 150° C. to about 450° C.

2. The process of producing valuable condensation products from a mixture of amyl alcohol with a normally liquid homologous alcohol comprising subjecting such mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide as the preponderant constituent and the reaction temperature ranging from about 150° C. to about 450° C.

3. The process of producing valuable condensation products from a mixture of hexyl alcohol with a normally liquid homologous alcohol comprising subjecting such mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide as the preponderant constituent and the reaction temperature ranging from about 150° C. to about 450° C.

4. The process of producing valuable condensation products from alcohols having more than four carbon atoms comprising subjecting such alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia as the preponderant constituent and the reaction temperature ranging from about 150° C. to about 450° C.

5. The process of producing valuable condensation products from a mixture of amyl alcohol with a normally liquid homologous alcohol comprising subjecting such mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide as the preponderant constituent and the reaction temperature ranging from about 150° C. to about 450° C.

6. The process of producing valuable condensation products from a mixture of amyl alcohol with a normally liquid homologous alcohol comprising subjecting such mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide as the preponderant constituent and the reaction temperature ranging from about 150° C. to about 450° C.

7. The process of producing valuable condensation products from an alcohol having more than four carbon atoms comprising subjecting such alcohol in conjunction with hydrogen to the action of a mixed catalyst comprising essentially a dehydrating metal oxide which will be stable in the reaction in admixture with a hydrogenating metal not exceeding in quantity 10% by weight of the complete catalyst and an alkali earth metal oxide as the preponderant constituent, the reaction temperature ranging from about 150° C. to about 450° C.

8. The process of producing valuable condensation products from alcohols having more than four carbon atoms comprising subjecting such alcohols in conjunction with hydrogen to the action of a mixed catalyst comprising essentially a dehydrating metal oxide which will be stable in the reaction in admixture with a hydrogenating metal oxide not exceeding in quantity 10% by weight of the complete catalyst and an alkali earth metal oxide as the preponderant constituent, the reaction temperature ranging from about 150° C. to about 450° C.

9. The process of producing valuable condensation products from alcohols having more than four carbon atoms comprising subjecting such alcohols in conjunction with hydrogen to the action of a mixed catalyst comprising essentially a dehydrating metal oxide which will be stable in the reaction with a hydrogenating metal not exceeding in quantity 10% by weight of the complete catalyst and with magnesia as the preponderant constituent, the reaction temperature ranging from about 150° C. to about 450° C.

10. The process of producing valuable condensation products from alcohols having more than four carbon atoms comprising subjecting such alcohols in conjunction with hydrogen to the action of a mixed catalyst comprising essentially a dehydrating metal oxide which will be stable in the reaction with a hydrogenating metal oxide not exceeding in quantity 10% by weight of the complete catalyst and with magnesia as the preponderant constituent, the reaction temperature ranging from about 150° C. to about 450° C.

11. The process of producing valuable condensation products from alcohols having more than four carbon atoms comprising subjecting such alcohols in conjunction with hydrogen to the action of a mixed catalyst comprising essentially a dehydrating metal oxide which will be stable in the reaction with a hydrogenating metal not exceeding in quantity 10% by weight of the complete catalyst and with barium oxide as the preponderant constituent the reaction temperature ranging from about 150° C. to about 450° C.

12. The process of producing valuable condensation products from alcohols having more than four carbon atoms comprising subjecting such alcohols in conjunction with hydrogen to the action of a mixed catalyst comprising essentially a dehydrating metal oxide which will be stable in the reaction with a hydrogenating metal not exceeding in quantity 10% by weight of the complete catalyst and with calcium oxide as the preponderant constituent, the reaction temperature ranging from about 150° C. to about 450° C.

OTTO FUCHS.
WILHELM QUERFURTH.